ROBERT J. RUMPF
INVENTOR

BY John A. Faulkner
Robert E. McCollum
ATTORNEYS

April 4, 1967 R. J. RUMPF 3,312,123
VEHICLE STEERING CONTROL
Filed March 11, 1965 4 Sheets-Sheet 2

ROBERT J. RUMPF
INVENTOR
BY John R. Faulkner
Robert E. McCollum
ATTORNEYS

ROBERT J. RUMPF
INVENTOR

April 4, 1967 R. J. RUMPF 3,312,123
VEHICLE STEERING CONTROL

Filed March 11, 1965 4 Sheets-Sheet 4

ROBERT J. RUMPF
INVENTOR

BY John R. Faulkner
Robert E. McCallum
ATTORNEYS 3,312,123
VEHICLE STEERING CONTROL
Robert J. Rumpf, Grosse Pointe, Mich., assignor to Ford Motor Company, Dearborn, Mich., a corporation of Delaware
Filed Mar. 11, 1965, Ser. No. 438,905
8 Claims. (Cl. 74—494)

This invention relates to a steering control for a motor vehicle. More particularly, it relates to one that eliminates the conventional steering wheel in a motor vehicle.

One of the primary objects of the invention is to provide a motor vehicle steering control that is easily manipulatable by the operator, occupies relatively little space in the vehicle passenger compartment, and does not interfere with the driver's vision regardless of his stature.

The conventional steering wheel has many disadvantages. It is often located such that people of short stature must look through or around the steering wheel, which interferes with proper vision and comfort. The size of the steering wheel and its location in relation to the vehicle seat is such that the driver often has difficulty in entering or leaving the vehicle. Also, substantially all conventional steering wheels require the driver to extend the arms to grip the wheel, which causes them to tire easily. Also, several turns of the steering wheel are generally required to make a complete turn from lock-to-lock, resulting in a hand-over hand type of turning motion by the vehicle driver.

The invention eliminates the above disadvantages by providing a steering control positioned within the vehicle passenger compartment in such a manner that it is easily grasped by the hands of the vehicle driver, and generally, only a wrist or finger action is required to operate the control and steer the vehicle. Two rotatably mounted hand grips are located on opposite sides of a centrally located steering column within easy reach of the left and right hands of the vehicle driver. The grips are positioned so that the operator's arms can be completely supported upon arm rests and, therefore, remain comfortable at all times. The small size of the hand grips and their spaced locations remove them from positions interfering with the driver's vision, and cause them to occupy little of the passenger space on the driver's side. They also provide little interference with the ingress or egress of the operator with respect to the vehicle. The invention further permits tilting of the steering control assembly so that it can be angularly moved towards or away from the driver to permit an even easier ingress or egress from the vehicle passenger compartment.

It is an object of the invention, therefore, to provide a motor vehicle steering control that is easily operated, is safer and occupies less space than a conventional steering wheel, allows operation by either or both hands of an operator, and provides better vision for the vehicle driver.

Other objects, features and advantages of the invention will become apparent upon reference to the succeeding, detailed description thereof, and to the drawings illustrating the preferred embodiments thereof; wherein, FIGURE 1 is a perspective view of a steering control constructed according to the invention;

Figure 1:
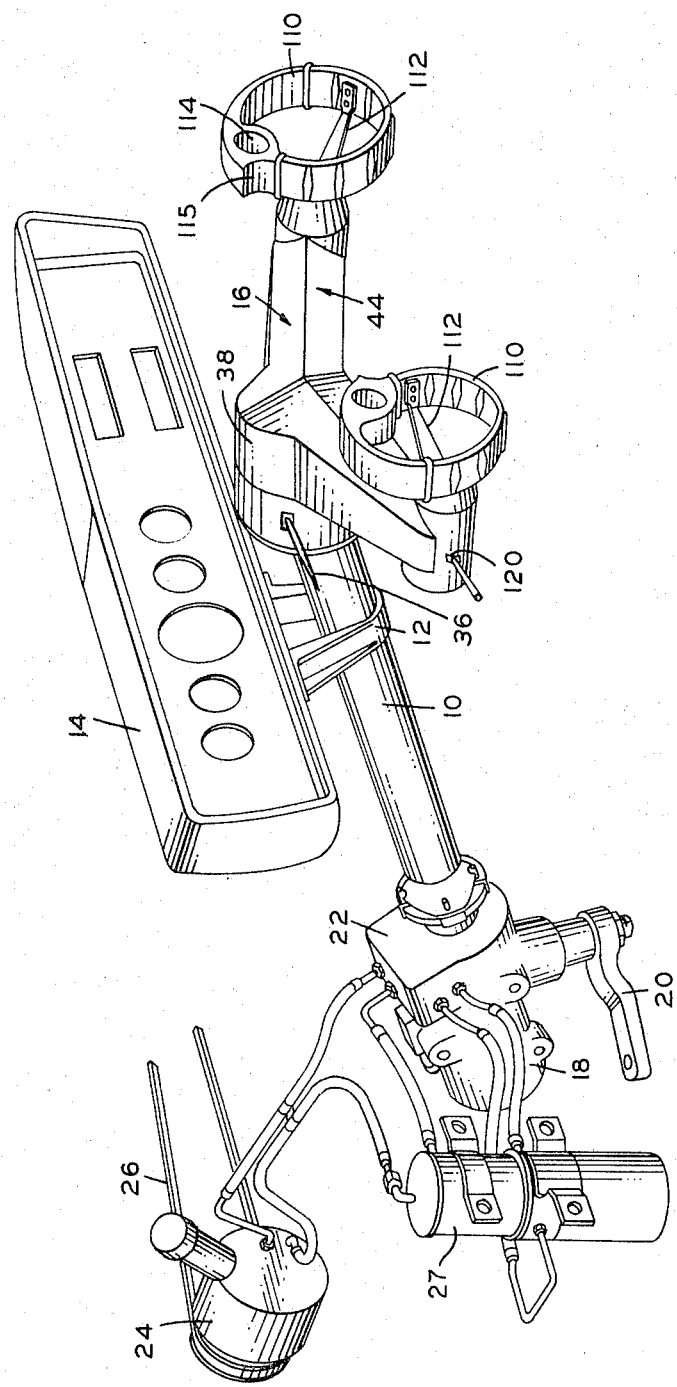

FIGURE 1 shows, isometrically, a portion of a steering control mechanism for a motor vehicle. A conventional steering column 10, rotatably supporting a steering shaft, is partially supported in a bracket 12 secured to a vehicle instrument panel or dash 14. At its upper end, the steering column and shaft are pivotally secured to an operator movable steering control means 16. At its lower end, column 10 is fixed to a steering gear housing indicated at 18 having a linkage 20. The steering gear in this case is a power operated unit, and includes an auxiliary or emergency power steering unit 22 that automatically takes over in the event of a failure in the main power steering circuit. The power steering unit is supplied with fluid from a main pump unit 24 driven from the engine by a belt 26. The auxiliary pump, electric motor and reservoir are contained in an assembly 27.

Figure 2:
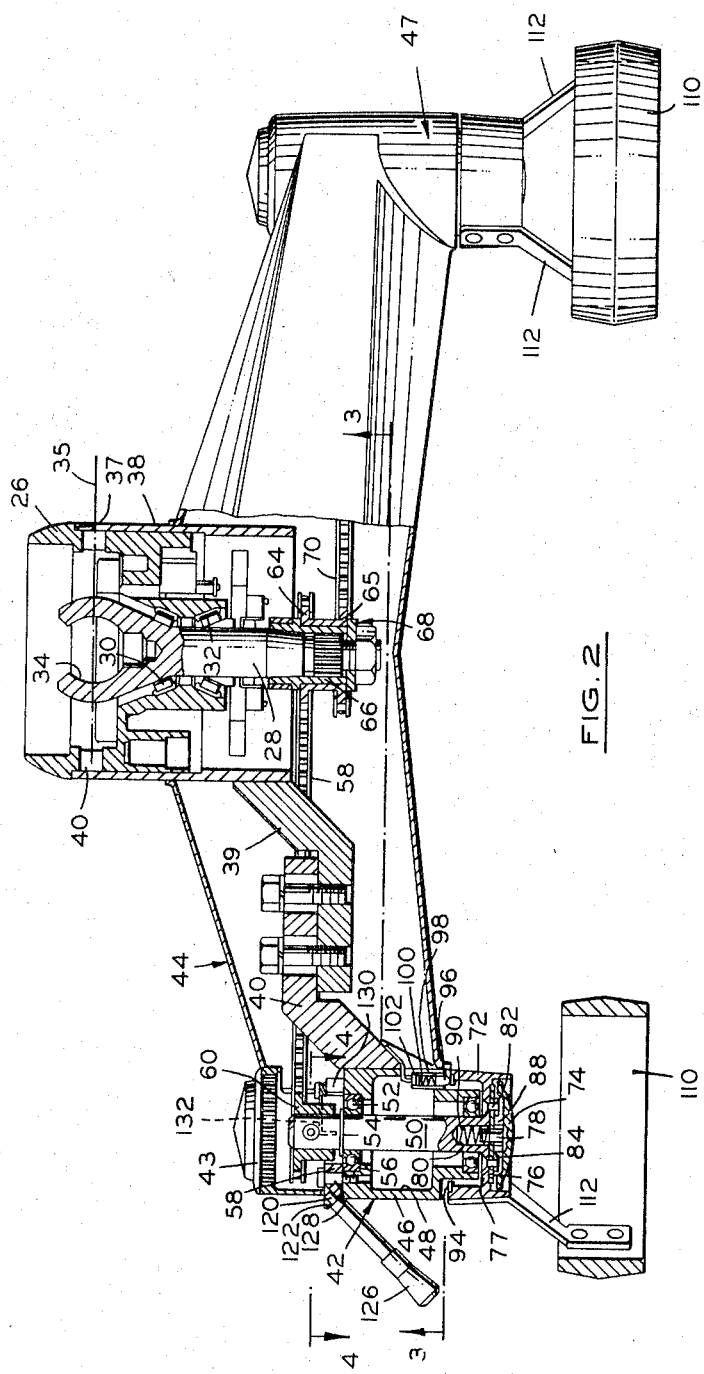
FIGURE 2 is a plan view with parts broken away and in section of a steering control constructed according to the invention.

FIGURE 2, which is essentially to scale, shows the details of construction of the operator-movable steering control unit 16. It has a main annular housing and fairing member 26 that constitutes the upper end of the steering column and supports the upper end of a conventional steering shaft 28 on pairs of spaced annular bearings 30 and 32. The yoke end 34 of shaft 28 provides a universal connection to the lower portion (not shown) of the steering shaft so that shaft 28 not only can be rotated, but also the entire steering control unit 16 can be tilted about an axis 35 passing through yoke 34. The mechanism for tilting the steering control shown in FIGURE 2 with respect to the steering column is not shown since it is known and is believed to be unnecessary for an understanding of the invention. Suffice it to say that a lever 36, shown in FIGURE 1, would be used to release the steering control 16 for angular movement to any one of several pivotal positions.

Support 26 is provided with an annular shoulder 37 against which is located an annular shroud or fairing 38 that is secured to support 26 by bolts or screws (not shown). Shroud 38 extends rearwardly towards the vehicle passenger compartment to enclose the upper extremity of steering shaft 28. A pair of laterally extending support arms 39 are welded to shroud 38 at one end, and are bolted to an equal number of laterally extending support arms 40. Arms 40 are in turn welded to a pair of secondary housings 42.

The upper part of each housing 42 is closed by an annular cap 43 that has a pressfit within the end of the casing. A streamlined annular casing 44 is fixedly secured to the sides of each of housings 42 and cap 43, and to shroud 38, for enclosing the wing and central portions of the steering unit and providing a streamlined appearance to them. Both housings 42 are constructed in substantially the same manner, except for the turn signal mechanism forming part of the lefthand housing 46; therefore, only the details of one will be given.

The left hand housing 46 has a hollow interior 48, and rotatably supports a steering control shaft 50 on a pair of spaced bearings 52. The shaft is located axially in one direction by a snap ring 54 in a groove in the shaft. The bearings are located axially in one direction against a shoulder 56 on casing 42 and in the other direction by a spring centered turn signal actuator member 58 pivotally secured to casing 42.

The upper portion of shaft 50 has a pinned connection to a sprocket wheel 60. A chain member 62 is trained around wheel 60 and also around one portion 64 of a double sprocket wheel secured on steering shaft 28. The double sprocket wheel is formed on a sleeve 66 wedgingly secured on the end of steering shaft 28 by a lock and washer assembly 68. The second sprocket 65 is connected by a chain 70 to the drive sprocket (not shown) for the right hand steering control unit 47. The diameters of sprockets 60, 64 and 65 are suitably chosen to provide the proper ratio between turns of the sprocket wheel 56 and corresponding turns of the main steering shaft 28. It will be clear that any suitable combination of ratios could be used without departing from the scope of the invention.

The lower portion of shaft 50 is formed with an H or hat-shaped cross-section, as best seen in FIGURE 2. The annular peripheral portion 72 constitutes a fairing or streamlined housing within the open end of which is flush mounted a horn button 74. The horn button assembly includes an annular contact plate 76 that is centrally apertured to receive the stem 78 of the horn button in a suitable recess 80 in shaft 50.

As best seen on the right-hand side of FIGURE 2, and in FIGURE 1, an annular hand grip 110 is fixedly secured to shroud 72 by two diagonally extending web-like brackets 112 secured at opposite ends to shroud 72 and grip 110. As seen more clearly in FIGURE 1, the grip is an annular member that may be molded of suitable material, such as plastic, for example, and has a finger or thumb opening 114 formed therein. At this enlarged portion of the hand grip, the portion 115 adjacent opening 114 is formed to the curvature of a thumb or finger so that the operator may rotate the hand grip in this manner, if desired, rather than by inserting the thumb in opening 114.

It will be clear from the description thus far, that the vehicle operator may grasp the hand grips 110 in his left and right hands in any comfortable manner, such as by inserting a finger or thumb in holes 114, or by positioning the thumb around the grip at the curved portion 115. Rotation of both hand grips in the same direction, that is, clockwise or counterclockwise, then rotates both steering control shafts 50 in the same direction. This rotates sprocket wheels 60 and 64, 65 in the same direction to turn steering shaft 28 in the desired direction and at the ratio determined by the diameters of the respective sprocket wheels.

It will be seen, therefore, that steering can be accomplished simply by rotating the hand grips in one direction or the other either by means of a single finger on one hand, both hands movable simultaneously in the same direction, or by any combination of finger movements so long as they are in the same direction with respect to left and right hands. Rotation of the hand grips rotates shafts 50 and sprocket wheels 60 and 64 to rotate steering shaft 28. The front wheels of the vehicle are then pivoted in a known manner. The arms of the vehicle driver may be comfortably supported upon arm rests so that the only action required is either a simple turning motion of the finger, or by a simple twisting of the wrist. No movement of the arms per se is necessary, thereby eliminating fatigue of the arms normally associated with operation of a conventional steering wheel over a long period of time.

It will be clear, of course, that the steering control described can be used with a constant ratio or a variable ratio steering gear, as desired, since as stated before, proper selection of the sprocket wheel diameters will control to a large extent the number of turns of the hand grips necessary to rotate steering shaft 28 from a lock-to-lock position.

Figure 3:
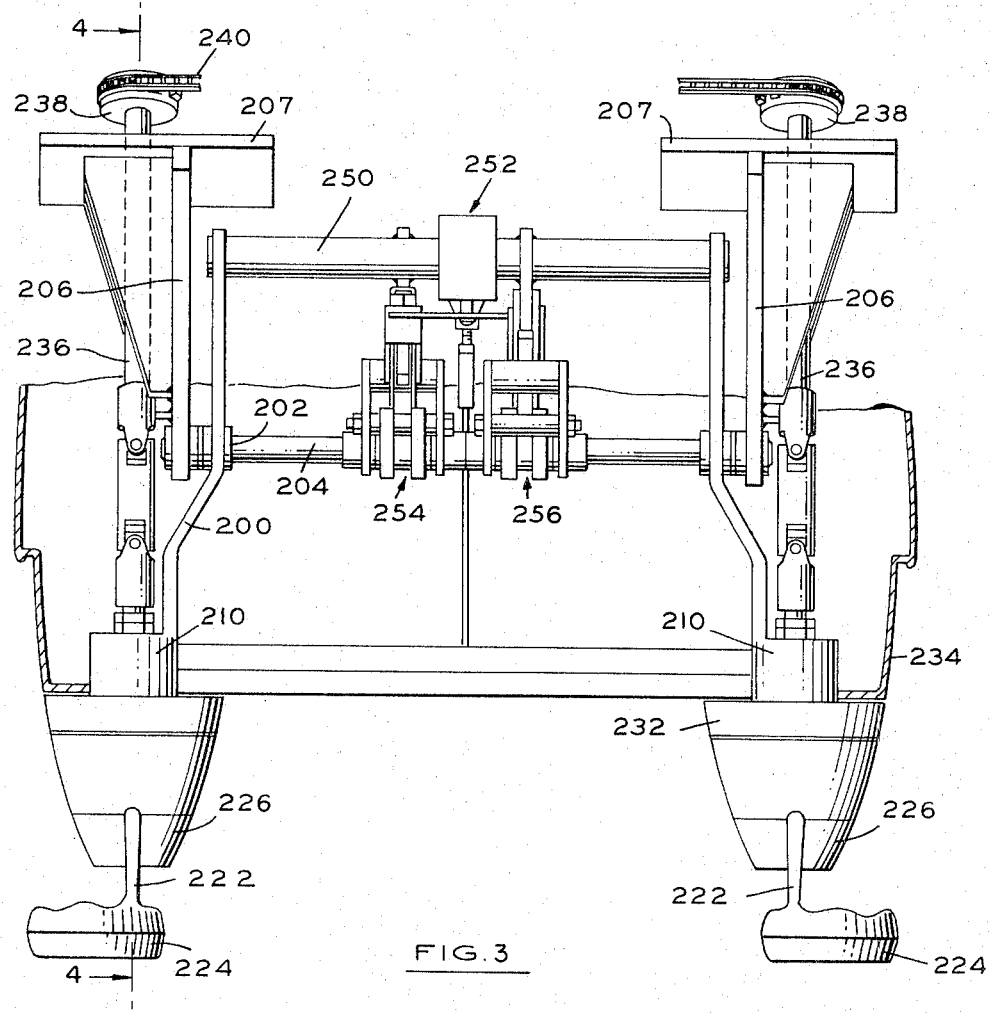
FIGURE 3 is a cross-sectional view of another embodiment of the invention.
Figure 4:
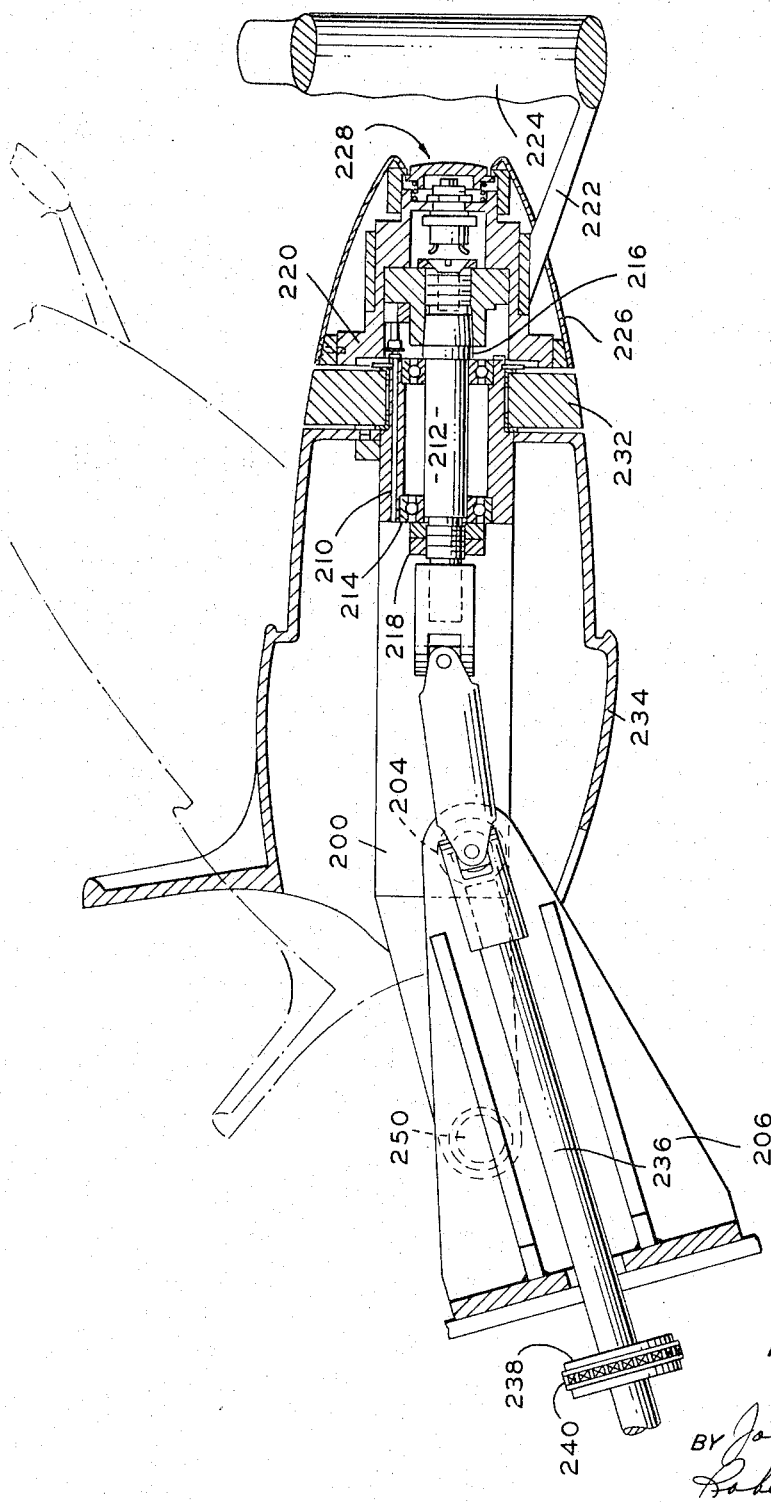
FIGURE 4 is an enlarged cross-sectional view taken on a plane indicated by and viewed in the direction of the arrows 4—4 of FIGURE 3.

FIGURES 3 and 4 show another embodiment of the invention. A pair of outwardly diverging support levers 200 are pivotally mounted on a shaft 204 that is mounted at its ends in the ends of a pair of fixed support arms 206. The arms 206 are in turn welded or fixed to a portion 207 of the vehicle chassis. Each of the forward ends of lever arms 200 are formed with an enlarged hollow boss 210 in which is rotatably mounted a steering control shaft 212. The shaft is mounted on suitable bearings 214 in a manner similar to the mounting of shafts 50 in casings 42 of the FIGURE 2 embodiment.

The upper end of each shaft 212 has an enlarged shoulder 216 bearing against the bearing 214 to locate the same in one axial direction, the bearings being located axially in the other direction by means of a nut 218. The upper portion of shaft 212 is suitably secured to an annular sleeve member 220 that is fixed by bracket members 222 to hand grips 224. A suitable fairing or streamline casing 226 surrounds the sleeve 220 and is bolted thereto.

The open upper end portion of sleeve 220 receives a horn button assembly 228. A second housing and fairing member 232 rotatably surrounds boss 210 and cooperates with a streamlined housing 234 enclosing the steering control unit.

The lower portion of steering control shafts 212 each have a universal connection with an angled shaft 236 that extends through the vehicle chassis support structure 206. While shaft 236 is rotatably mounted, it is otherwise nonmovable. A suitable sprocket wheel 238 is fixed to shaft 236, and a chain 240 is trained over the wheel and a wheel (not shown) secured to the end of steering shaft, not shown. It will thus be seen that rotation of the hand grips 222 in one direction or the other will cause a corresponding rotation of the sprocket wheels 238 to rotate the steering shaft in the desired manner.

Turning now to the pivotal movement of the entire steering unit, as stated previously, the two support lever arms 200 are pivotally mounted upon shaft 204. The lower end of levers 200 are fixed to a shaft 250. The central portion of shaft 250 contains a latching mechanism indicated in general at 252 that cooperates with two overrunning locking means indicated in general by numerals 254 and 256. The details of these locking mechanisms are not given since they are known and are believed to be unnecessary for an understanding of the invention. Suffice it to say that upon movement of a release lever similar to lever 36 shown in FIGURE 1, that the entire hand grip assemblies can be rotaated as a unit about shaft 204 to any one of a number of angular positions to arcuately move the steering assembly away from or towards the vehicle operator without interrupting the drive connection between the hand grips, shafts 212, and the chain sprocket drive connection to the steering shaft.

It will be seen from the embodiment illustrated in FIGURES 3 and 4 that the chain drive means for transferring the rotary movement of the hand grips 222 to the steering shaft can be located remote from the hand grip assemblies in a location on either side of the fire wall and, therefore, out of the passenger compartment of the vehicle. At the same time, the hand grip assemblies can be tilted as a unit to any one of numerous pivotal positions for easy ingress and egress of the operator from the motor vehicle.

While the invention has been illustrated in its preferred embodiments in the figures, it will be clear to those skilled in the arts to which the invention pertains that many changes and modifications may be made thereto without departing from the scope of the invention.

I claim:

1. A tiltable steering assembly for a motor vehicle, comprising, fixed support means within a portion of the vehicle, a first pair of essentially parallel shafts rotatably mounted in said fixed support means, a second pair of essentially parallel shafts each pivotally secured to one of said first pair of shafts, vehicle operator grip means fixed to each of said second shafts for rotation thereof and therewith, means pivotally secured to said first support means and rotatably supporting said second shafts whereby tilting movement of said second support means relative to said first support means effects a simultaneous tilting movement of said second shafts, and torque transfer means interconnecting said first shafts to each other and adapted to be connected to a teering shaft of said vehicle to thereby provide simultaneously rotation of all said shafts upon rotation of one of said shafts.

2. A steering assembly as in claim 1, said torque transfer mean being mounted on the ends of said first shafts remote from the pivotal connections to said second shafts.

3. A steering assembly as in claim 2, said first support means comprising a pair of space fixed supports adapted to be positioned on opposite sides of the vehicle rotatable steering shaft, first interconnecting means connecting said pair of first supports, said second support means including a pair of spaced levers pivotally mounted on said first interconnecting means, second interconnecting means fixedly connecting said levers for simultaneous pivotal movement, said levers each having a housing at one end rotatably supporting one of said second shafts therein.

4. A steering assembly as in claim 3, including yieldable latch means between said first and second interconnecting means for maintaining said second support means in predetermined pivotal relationships with respect to said first support means upon pivotal movement of said second support means and second shafts.

5. A steering assembly as in claim 3, said torque transfer means comprising chain and sprocket means operably interconnecting said first shafts to each other and adapted to be connected to the vehicle steering shaft.

6. A steering assembly as in claim 1, said torque transfer means comprising chain and sprocket means.

7. A steering assembly as in claim 1, said second support means including a housing surrounding and enclosing both of said second shafts.

8. A steering assembly as in claim 1, said first support means comprising a pair of fixed members and interconnecting means interconnecting said members, said second support means including a pair of interconnected levers pivotally mounted on said interconnecting means and each having a housing each rotatably supporting one of said second shafts therein.

References Cited by the Examiner
UNITED STATES PATENTS

| | | | |
|---|---|---|---|
| 2,507,600 | 5/1950 | Kaiser et al. | 74—494 |
| 3,176,537 | 4/1965 | Zeigler | 74—492 |
| 3,183,884 | 5/1965 | Daniels | 74—493 X |
| 3,232,135 | 2/1966 | Aho et al. | 74—494 |

References Cited by the Applicant
UNITED STATES PATENTS

| | | |
|---|---|---|
| 2,737,060 | 3/1956 | Russell. |
| 2,803,147 | 8/1957 | Judd. |
| 2,827,801 | 3/1958 | Ingolia. |
| 2,860,720 | 11/1958 | Huff et al. |
| 2,931,244 | 4/1960 | Brewer. |

FOREIGN PATENTS 935,646 11/1955 Germany.

MILTON KAUFMAN, *Primary Examiner.*